(12) United States Patent
Holland

(10) Patent No.: US 9,179,663 B1
(45) Date of Patent: Nov. 10, 2015

(54) SWATTER APPARATUS WITH REMOVABLE FILMS

(71) Applicant: George B. Holland, Macon, GA (US)

(72) Inventor: George B. Holland, Macon, GA (US)

( * ) Notice: Subject to any disclaimer, the term of this patent is extended or adjusted under 35 U.S.C. 154(b) by 162 days.

(21) Appl. No.: 14/039,162

(22) Filed: Sep. 27, 2013

(51) Int. Cl.
*A01M 3/02* (2006.01)
*A01M 3/04* (2006.01)

(52) U.S. Cl.
CPC ............. *A01M 3/022* (2013.01); *A01M 3/02* (2013.01); *A01M 3/04* (2013.01)

(58) Field of Classification Search
CPC .......... A01M 3/02; A01M 3/022; A01M 3/04
USPC .................................... 43/136, 137
See application file for complete search history.

(56) References Cited

U.S. PATENT DOCUMENTS

| | | | | | |
|---|---|---|---|---|---|
| 1,161,654 | A | * | 11/1915 | Gomber | A01M 3/02 43/137 |
| RE15,154 | E | * | 7/1921 | Gomber | 43/137 |
| 2,015,092 | A | * | 9/1935 | Turnquist | 43/137 |
| 2,578,183 | A | * | 12/1951 | Furst | 43/137 |
| 2,651,878 | A | * | 9/1953 | Webbeking | A01M 3/02 43/137 |
| 2,736,129 | A | * | 2/1956 | Roop | 43/137 |
| 2,891,347 | A | * | 6/1959 | Swint | A01M 3/02 43/137 |
| 3,203,135 | A | * | 8/1965 | Tunnell | A01M 3/005 43/137 |
| 3,449,856 | A | * | 6/1969 | Weaver | 43/136 |
| 3,673,730 | A | * | 7/1972 | Hegenberger | A01M 3/02 43/137 |
| 4,653,222 | A | * | 3/1987 | Viscosi | 43/137 |
| 4,674,227 | A | * | 6/1987 | Maier | A01M 3/02 43/137 |
| 4,959,923 | A | | 10/1990 | Aiello et al. | |
| 5,029,411 | A | * | 7/1991 | Keenan | 43/136 |
| 5,095,648 | A | * | 3/1992 | Keenan | 43/136 |
| 5,269,092 | A | * | 12/1993 | Cobble | 43/137 |
| 5,568,699 | A | * | 10/1996 | Wadsworth | 43/137 |
| 5,630,290 | A | * | 5/1997 | Wade et al. | 43/136 |
| 6,055,767 | A | * | 5/2000 | Carter | 43/137 |
| 6,185,862 | B1 | * | 2/2001 | Nelson | 43/136 |
| 6,564,505 | B1 | * | 5/2003 | Anderson | A01M 3/027 43/136 |
| 6,651,379 | B1 | * | 11/2003 | Nelson | 43/136 |
| 6,957,510 | B1 | * | 10/2005 | Kominkiewicz | 43/137 |
| 7,430,830 | B1 | * | 10/2008 | Rosa | 43/137 |
| 7,721,486 | B2 | * | 5/2010 | Rosario | 43/136 |
| 7,726,065 | B2 | * | 6/2010 | Jacobson | 43/136 |
| 7,739,830 | B1 | * | 6/2010 | Wells | 43/137 |
| 2004/0163304 | A1 | * | 8/2004 | Nelson | 43/136 |
| 2008/0040967 | A1 | | 2/2008 | Young | |
| 2012/0180380 | A1 | * | 7/2012 | Grant, III | 43/136 |
| 2013/0291428 | A1 | * | 11/2013 | Wegscheider | 43/137 |
| 2014/0352201 | A1 | * | 12/2014 | Wegscheider | 43/137 |

FOREIGN PATENT DOCUMENTS

| | | | | | |
|---|---|---|---|---|---|
| JP | 06209685 | A | * | 8/1994 | ............. A01M 3/04 |
| JP | 09275873 | A | * | 10/1997 | ............. A01M 3/04 |
| JP | 10042768 | A | * | 2/1998 | ............. A01M 3/04 |
| JP | 2010035539 | A | * | 2/2010 | ............. A01M 3/02 |

* cited by examiner

*Primary Examiner* — Darren W Ark
(74) *Attorney, Agent, or Firm* — Williams Intellectual Property; Benjamin F. Williams

(57) ABSTRACT

A swatter apparatus with removable films that includes a plurality of removable films disposed in layers covering each of a first surface and second surface of a head portion, each of said plurality of removable films removable sequentially from the head portion after swatting, whereby insect and other pest remains are readily separable from the head portion when an uppermost one of the plurality of removable films is peeled from the head portion for expedient disposal.

3 Claims, 3 Drawing Sheets

SWATTER APPARATUS WITH REMOVABLE FILMS

BACKGROUND OF THE INVENTION

Various types of swatter apparatuses are known in the prior art. However, what is needed is a swatter apparatus with removable films that includes a plurality of removable films disposed in layers covering each of a first surface and second surface of a head portion, each of said plurality of removable films thereby removable sequentially from the head portion after swatting, whereby insect and other pest remains are readily separable from the head portion when an uppermost one of the plurality of removable films is peeled from the head portion for expedient disposal.

FIELD OF THE INVENTION

The present invention relates to a swatter apparatus with removable films, and more particularly, to a swatter apparatus with removable films that includes a plurality of removable films disposed in layers covering each of a first surface and second surface of a head portion, each of said plurality of removable films thereby removable sequentially from the head portion after swatting, whereby insect and other pest remains are readily separable from the head portion when an uppermost one of the plurality of removable films is peeled from the head portion for expedient disposal.

SUMMARY OF THE INVENTION

The general purpose of the swatter apparatus with removable films, described subsequently in greater detail, is to provide a swatter apparatus with removable films which has many novel features that result in a swatter apparatus with removable films which is not anticipated, rendered obvious, suggested, or even implied by prior art, either alone or in combination thereof.

The present swatter apparatus with removable films provides a convenient means for disposing of insect and other pest remains from the head portion of a swatter apparatus. After swatting an insect, or other pest, one of a plurality of removable films is peeled from the head portion thereby separating any insect remains upon said one of the plurality of removable films from the head portion for expedient disposal thereof.

The present swatter apparatus with removable films, therefore, includes a handle member attached to the head portion. The handle member includes an ergonomically configured shaft portion, a proximal end, and a distal end. The handle member is configured to be flexible and tensile.

The head portion is centrally disposed endwise from the shaft portion distal end. The head portion is generally flat, but also flexible and tensile, and may be wielded from the handle member for swatting. The head portion includes a first surface and a second surface.

A plurality of removable films is layered uniformly covering each of the first and second surfaces. Each of the removable films has an adhesive coating for trapping small pests to the surface of an uppermost removable film and for engaging each of the plurality of removable films in layers uniformly covering each of the head portion first surface and second surface. Each of the plurality of removable films is removable sequentially from each of the first and second surface, whereby insect remains caught on the head portion after swatting are readily removed from the head portion when an uppermost one of the plurality of removable films is peeled from either the first or second surface for convenient disposal thereof.

The adhesive, which uniformly adheres each of the plurality of removable films in position covering the head portion first and second surfaces, further enables the entrapment of insects and pests thereto. Removal of an uppermost one of the plurality of removable films, therefore, reveals an underlying one of the plurality of removable films with adhesive uniformly disposed thereover, remaining subsequent the removal of the overlying one of the plurality of removable films, for the entrapment of insects and other pests, as desired.

To enable airflow through the head portion during swatting, and thus prevent displacement of a targeted insect, or other pest, a plurality of apertures is rendered through the head portion and each of the plurality of removable films. In the preferred embodiment herein disclosed, each of the plurality of apertures is elongate, has rounded ends, and has a longitudinal axis which is disposed at an angle to a longitudinal axis of the head portion. The apertures being arranged in two rows adjacent opposing edges of the head portion of the head portion.

Thus has been broadly outlined the more important features of the present swatter apparatus with removable films so that the detailed description thereof that follows may be better understood and in order that the present contribution to the art may be better appreciated.

Objects of the present swatter apparatus with removable films, along with various novel features that characterize the invention are particularly pointed out in the claims forming a part of this disclosure. For better understanding of the swatter apparatus with removable films, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
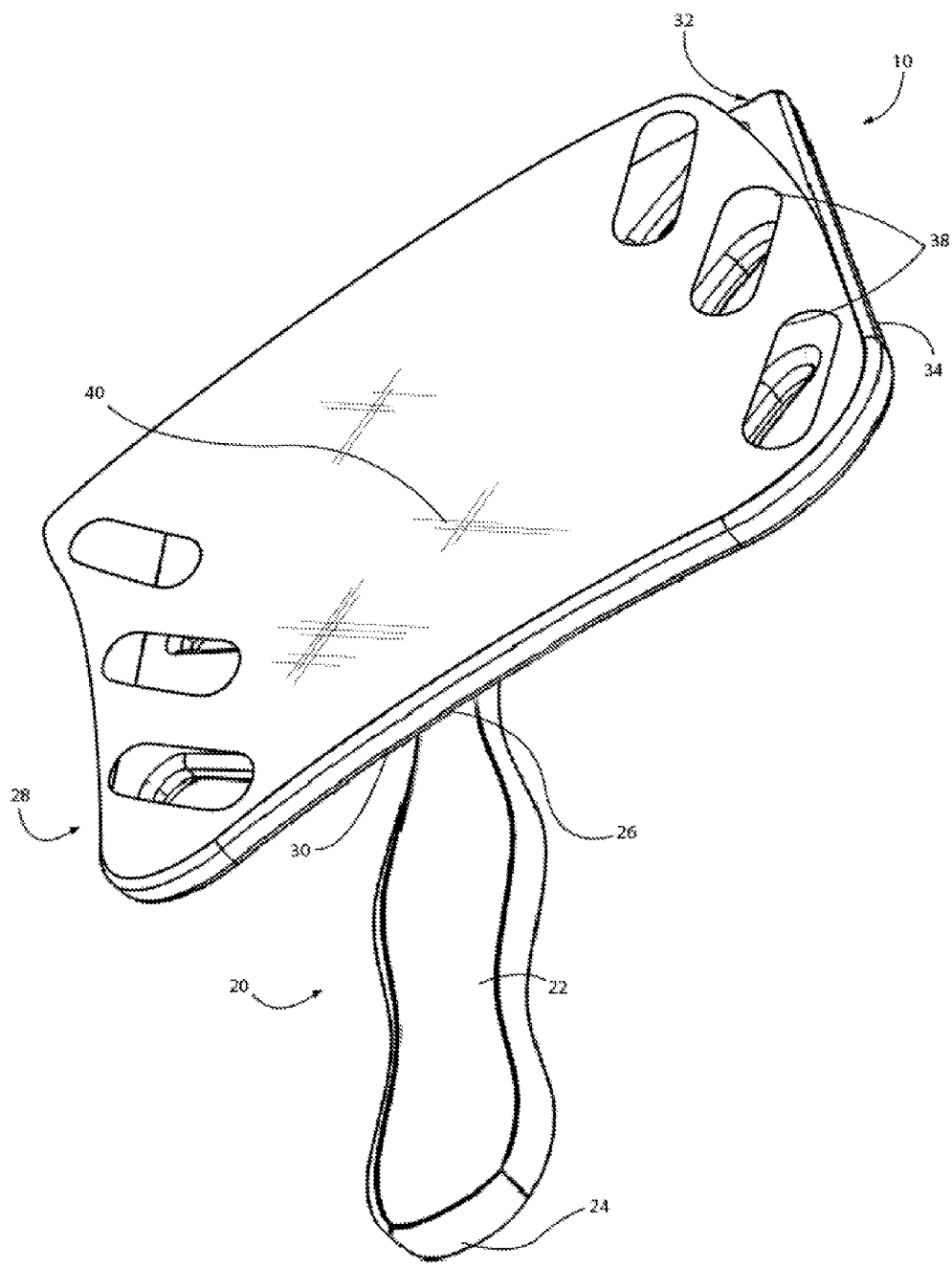
FIG. 1 is an isometric view.
Figure 2:
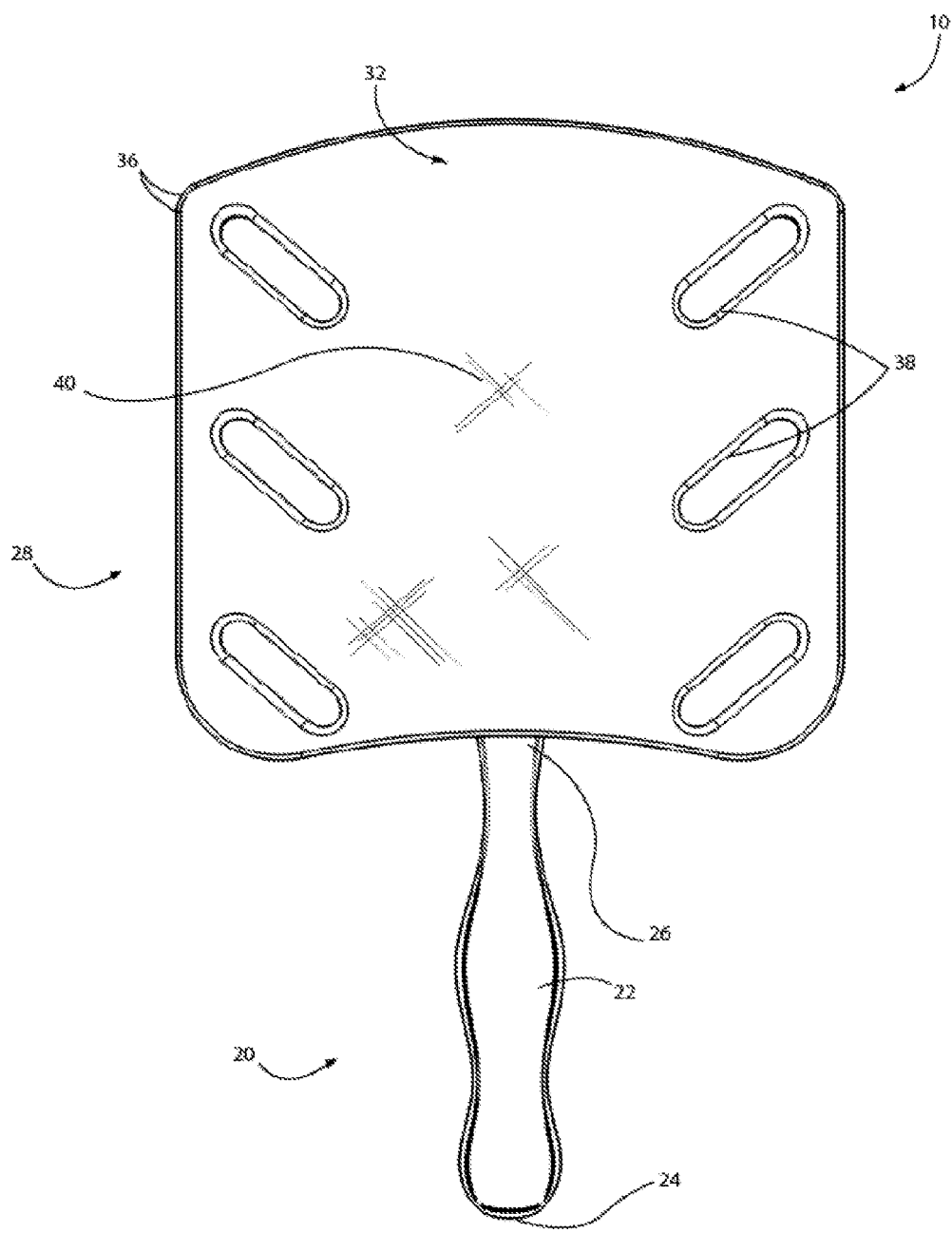
FIG. 2 is a front view.
Figure 3:
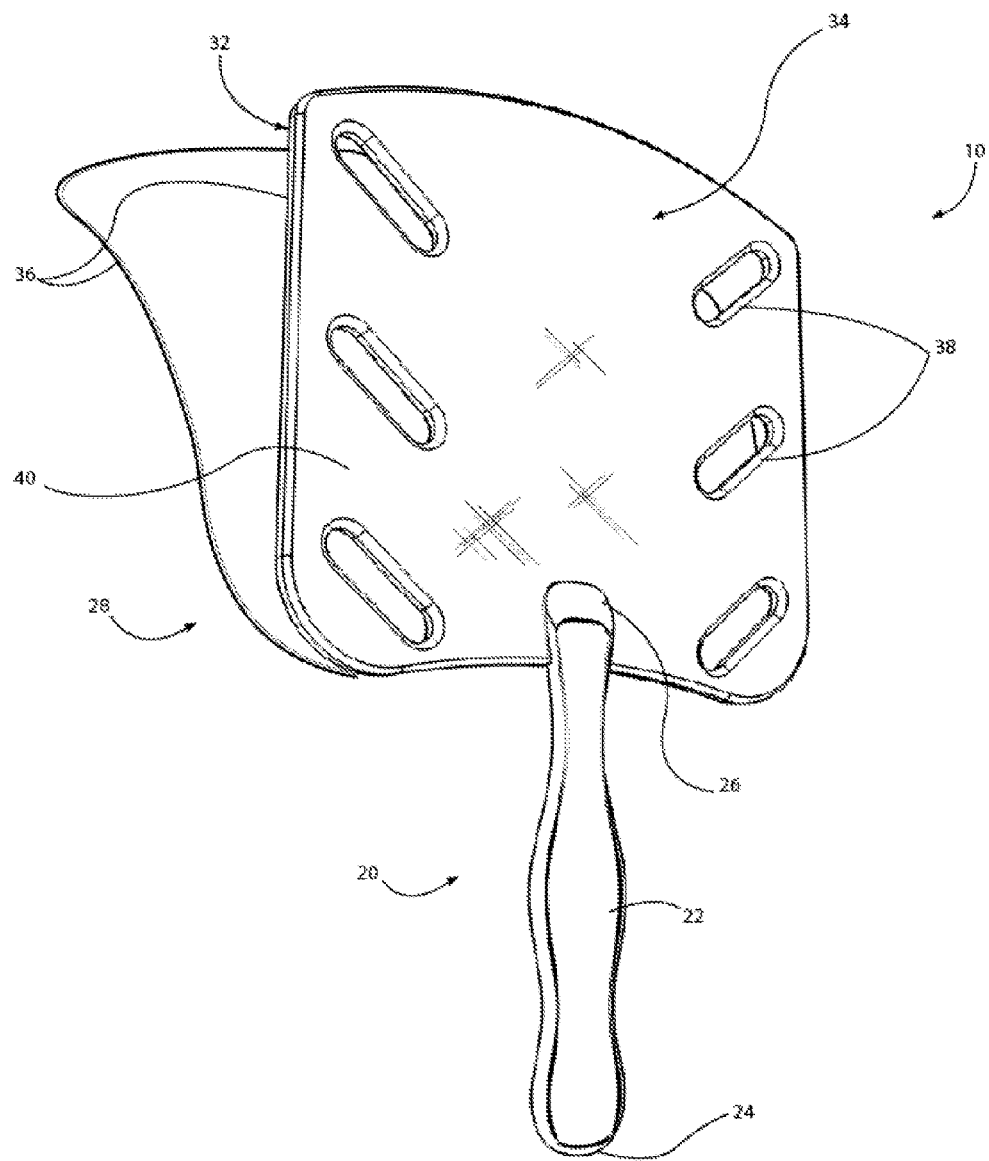
FIG. 3 is an isometric view.

With reference now to the drawings, and in particular FIGS. 1 through 3 thereof, example of the instant swatter apparatus with removable films employing the principles and concepts of the present swatter apparatus with removable films and generally designated by the reference number 10 will be described.

Referring to FIGS. 1 through 3 a preferred embodiment of the present swatter apparatus with removable films 10 is illustrated.

The present swatter apparatus with removable films 10 enables convenient removal and ready disposal of insect remains from a head portion 28 of a swatter apparatus 10 subsequent use.

The present swatter apparatus with removable films 10 includes an elastically flexible handle member 20 ergonomically configured for ready grasping. The handle member 20 includes an ergonomically configured shaft portion 22, a proximal end 24, and a distal end 26.

A polymeric, flattened head portion 28 is centrally disposed endwise upon the handle member 20 distal end 26 at a first edge 30 of the head portion 28. The head portion 28 is tensile, and may therefore be wielded when the handle member 20 shaft portion 22 is grasped for swatting.

The head portion 28 includes a first surface 32 and a second surface 34 disposed on opposite sides of the head portion 28. A plurality of removable films 36 is disposed in layers removably adhered covering each of the first surface 32 and second surface 34, each of said removable films 36 layered thereat and sequentially removable therefrom. An adhesive 40 is disposed upon each of the plurality of removable films 36, whereby small targeted insects and other pests may be trapped upon the head portion 28 when caused to contact an uppermost one of the plurality of removable films 36 disposed at the head portion 28 first and second surface 32, 34.

Subsequent swatting of insects and pests, an uppermost one of the plurality of removable films 36 is thence readily peeled from the head portion 28, whereby the insect remains, or other pest remains, are expediently separated from the head portion 28 for convenient disposal. Removal of an uppermost one of the plurality of removable films 36 maintains the adhesive 40 disposed outfacing from the subsequently revealed one of the plurality of removable films 36 for subsequent use trapping and swatting insects, or other pests, as case may be. Thus the present device 10 is reusable, as desired, fro swatting and entrapping insects, or other pests, as desired.

Thus, the adhesive 40 maintains uniform contact between each of the plurality of removable films 36, each of said plurality of removable films 36 layered and uniformly covering each of the first and second surfaces 32, 34 of the head portion 28 and also provides for entrapment of insects, or other pests, to the uppermost one of the plurality of removable films 36.

To enable passage of air through the head portion 28 when the device 10 is wielded for swatting, a plurality of apertures 38 is disposed through the head portion 28 and each of the plurality of removable films 36. In the preferred embodiment herein disclosed, there are six elongate apertures having rounded ends and axes disposed at an angle to a longitudinal axis of the head portion 28, each of said elongate apertures disposed more proximal an edge of the head portion 28. The plurality of apertures 38 being arranged in two rows adjacent opposing edges of the head portion 28. The plurality of apertures 38 enables transmission of air through the head portion 28 and each of the plurality of removable films 36 when the device 10 is wielded whereby displacement of a targeted insect, or other pest, is prevented.

What is claimed is:

1. A swatter apparatus with removable films comprising a plurality of removable films layered and removably adhered uniformly upon each of a first surface and a second surface of a head portion, each of said plurality of removable films having an adhesive suffused thereover to ensnare targeted insects and pests, each of said plurality of removable films sequentially removable from the head portion subsequent swatting, said head portion and plurality of removable films having a plurality of elongate apertures disposed therethrough superimposed only in edgewise position upon the head portion such that the plurality of elongate apertures are arranged in two rows extending along opposing edges of the head portion, each aperture of the plurality of elongate apertures has rounded ends and a longitudinal axis which is at an angle to a longitudinal axis of the head portion, wherein insect remains, or other pest remains, are readily separable from the head portion for expedient disposal.

2. A swatter apparatus with removable films comprising:
   an elastically flexible handle member including:
      an ergonomically configured shaft portion;
      a proximal end;
      a distal end;
   a head portion centrally disposed endwise upon the handle member at the distal end, said head portion including:
      a first surface and a second surface;
      a plurality of removable films removably adhered in layers to uniformly cover each of the first surface and second surface, each of said removable films having an adhesive disposed thereover to removably adhere each of the plurality of removable films together, and removably adhere said plurality of removable films to uniformly cover each of the first surface and second surface, whereby said adhesive is usable to ensnare targeted insects or pests to an uppermost one of the plurality of removable films and the plurality of removable films is layered upon the head portion and sequentially removable therefrom; and
      a plurality of elongate apertures only disposed through the head portion and each of the plurality of removable films superimposed in edgewise position upon the head portion such that the plurality of elongate apertures are arranged in two rows extending along opposing edges of the head portion, each aperture of the plurality of elongate apertures has rounded ends and a longitudinal axis which is at an angle to a longitudinal axis of the head portion;
   wherein each of the removable films is sequentially removable for expedient disposal subsequent use of the swatter apparatus with removable films to swat targeted insects, or other pests, whereby insect remains, or other pest remains, are conveniently removed from the head portion for ready disposal thereof.

3. The swatter apparatus with removable films of claim 2 wherein the plurality of apertures consists of at least six elongate apertures having axes disposed at an angle to the longitudinal axis of the head portion, each of said six elongate apertures disposed proximal one of said opposing edges of the head portion.

* * * * *